March 19, 1963  YOSHIAKI ARATA ETAL  3,082,314
PLASMA ARC TORCH
Filed April 18, 1960  2 Sheets-Sheet 1

INVENTORS
YOSHIAKI ARATA
BY TADAO UNO
TAKEZO NAKAMURA
ATTORNEY

March 19, 1963  YOSHIAKI ARATA ETAL  3,082,314
PLASMA ARC TORCH

Filed April 18, 1960  2 Sheets-Sheet 2

Fig. 3

INVENTORS
YOSHIAKI ARATA
BY TADAO UNO
TAKEZO NAKAMURA

ATTORNEY

United States Patent Office 3,082,314
Patented Mar. 19, 1963

3,082,314
PLASMA ARC TORCH
Yoshiaki Arata, Amagasaki-shi, Hyogo-ken, and Tadao Uno and Takezo Nakamura, Nishinomiya-shi, Hyogo-ken, Japan, assignors to Shin-Meiwa Kogyo Kabushiki Kaisha, Hyogo-ken, Japan, a corporation of Japan
Filed Apr. 18, 1960, Ser. No. 22,988
Claims priority, application Japan Apr. 20, 1959
2 Claims. (Cl. 219—75)

This invention generally relates to improvements in plasma arc torches for use in cutting, welding and like applications. A plasma arc torch wherein an electrical arc or plasma arc attaining from over 10,000° C. to several tens of thousands of degrees centigrade by producing an arc between a pair of spaced rod electrode and ring-shaped electrode connected to opposite terminals of a suitable electric source and supplying a fluid to shield said arc so as to confine the electric arc into a small cross-sectional area has been heretofore generally known. However, in a torch such as above, the erosion of the electrode, particularly the cathode electrode, is excessive, and moreover it is difficult to obtain a stabilized plasma arc.

The chief object of this invention is to provide a method in which the aforementioned difficulty can be avoided.

Another object is to provide for the reduction in the amount used of the high cost inert gas that is used for obtaining the plasma arc, as well as to make it easy to accomplish the temperature regulation of the plasma arc.

Further objects and advantages of our invention will be apparent from a consideration of the following detailed description taken with the accompanying drawings, wherein:

FIG. 3 shows a cross-sectional view, in side elevation, of another embodiment of the invention.

Figure 1:
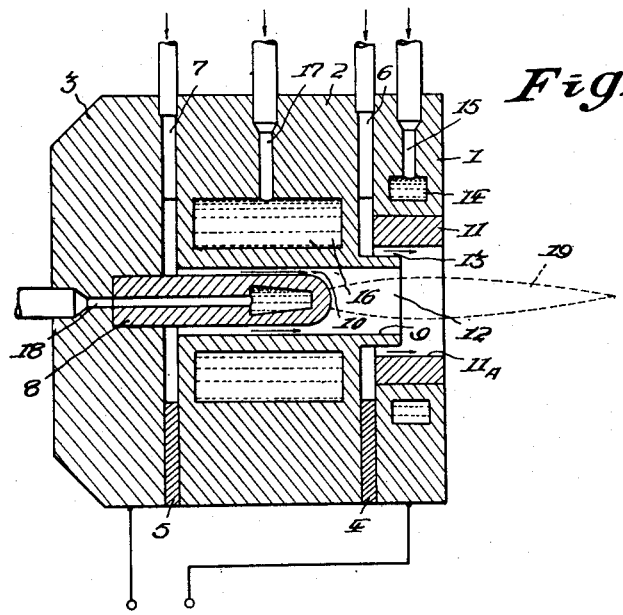
FIG. 1 is a cross-sectional view, in side elevation, showing an embodiment of this invention.

In FIG. 1, three plates, i.e., a front plate 1, a center plate 2, and a rear plate 3, are secured together in layers while interposing insulating rings 4 and 5, a part of which rings having been cut out. These cut-out portions of the aforesaid insulate rings form the fluid supply passages 6 and 7. In the center of the rear plate 3, the base of a positively energized rod electrode 8 is fixed, and an internal fluid injection passage 10 that is formed between this rod electrode 8 and the central cavity 9 of the center plate 2 communicates with the aforesaid supply passage 7. To the front plate 1 there is disposed with a close fit a negatively energized ring-shaped electrode 11. An annular wall 12 protrudes from the front part of the center plate 2, and its inner side communicates with the aforesaid central cavity 9. The tip of this annular wall 12 reaches to about the middle of the ring-shaped electrode 11, and an annular external fluid injection passage 13 formed therebetween communicates with the aforesaid supply passage 6. The two electrodes 8 and 11 and the two injection passages 10 and 13 are disposed concentrically on a common straight axis. The inside of the plate 1 is provided with an annular cooling chamber 14 which has an outlet 15 leading to the outside. And the center plate 2 likewise has a cooling chamber 16 and an outlet 17, while the rod electrode 8 is provided therein with a cooling passage 18.

When the front plate 1 and the rear plate 3 are connected with an electrical source and an electric arc is produced between the two electrodes 8 and 11, and on the other hand, an inert fluid, such as argon gas, is supplied from the supply passage 7 and jetted from the injection passage 10, a high temperature plasma arc 19 is produced. In this instance, inasmuch as the ring-shaped electrode 11 is isolated from the plasma arc 19 by means of the aforesaid inert fluid, it is possible to prevent to a certain degree the occurrence of partial bright points on the interior surface 11A and other surfaces as a result of the non-uniformity of the electric current, and in addition both electrodes are cooled. Thus the plasma arc 19 is not only stabilized, but also the erosion of both electrodes can be prevented at the same time. However, it is impossible to fully prevent as yet the occurrence of the foregoing partial bright points with only the shielding fluid from the injection passage 10 as described above, and therefore, the erosion of the electrode cannot be fully prevented. This invention is characterized in that fluids such as air, argon gas, or water, etc. are further supplied from the supply passage 6, which fluids are then jetted forth in an annular fashion while skirting the interior surface 11A of the ring-shaped electrode 11. By doing thus, the ring-shaped electrode 11 is completely isolated from the plasma arc 19 by means of two layers of annular fluids from the injection passages 10 and 13, whereby not only is the occurrence of partial bright points on the ring-shaped electrode prevented, but also good cooling thereof is accomplished. Thus, the plasma arc 19 is stabilized, and the erosion of both electrodes is held to a minimum. Furthermore, by increasing the amount of fluid jetting from the external injection passage 13, the plasma arc 19 can be confined still finer so as to raise the temperature. Hence, the temperature of the plasma arc can be regulated in accordance with the quantity of fluid that is supplied from the external injection passage 13. Moreover, since practically the total quantity of the fluid that is jetted from the external injection passage 13 is carried to the outside of the torch by means of the fluid jetting from the internal injection passage 10, and thus there being no possibility of part of the fluid flowing backwards, even though a non-inert fluid such as air or water is used instead of a high cost fluid, such as argon gas, erosion of the rod electrode 8 is hardly brought about.

Figure 2:
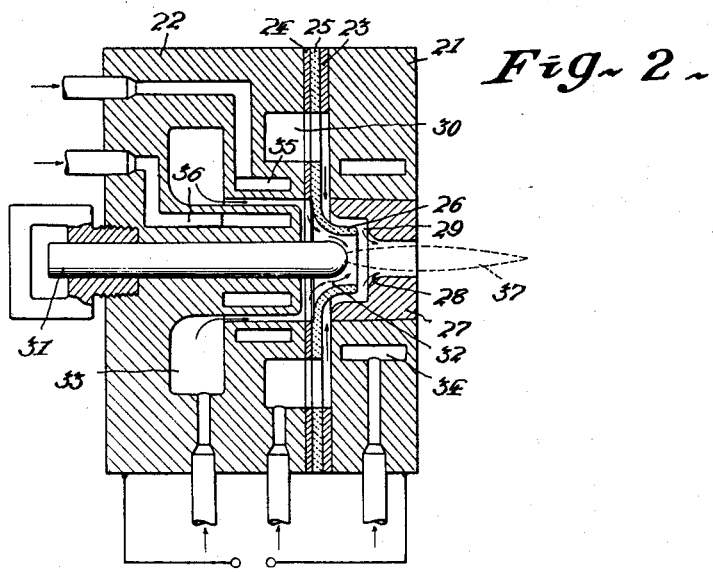
FIG. 2 is a drawing showing a modification of the embodiment shown in FIG. 1.

The embodiment shown in FIG. 2 is that of FIG. 1 in which the fluid injection passage (plural) have been improved, and the direction in which the fluid is jetted with respect to the plasma arc has been imparted at a strongly inclined angle. In the drawing, a plate 25 is held between a front plate 21 and a rear plate 22 with insulating rings 23 and 24 interposed therebetween. Between a mouth piece 26 in the center of the plate 25 and the curved surface 28 of a ring-shaped electrode 27 an oblique passage 29 is formed, through which the fluid of chamber 30 passes and is jetted with respect to the plasma arc 37 at a strongly inclined angle. Between the tip of rod electrode 31 and the mouth piece 26, there is formed a passage 32 from which the fluid of a rear chamber 33 is also jetted with respect to the plasma arc 37 at a strongly inclined angle. 30, 34, 35 and 36 show the cooling chambers.

If, in the torch shown in FIG. 1, the quantity of the fluid being jetted from the external injection passage 13 is gradually increased and its pressure becomes greater than the pressure within the central cavity 9, part of the fluid from the injection passage 13 would flow back into the central cavity 9 and come in contact with the surface of electrode 8. Hence, in case, as the fluid, air or water, etc. is used, the rod electrode 8 would be consumed by the oxygen contained therein. On the other hand, if the quantity of the inert gas flowing from the internal injection passage 10 is increased for the purpose of preventing such consumption, it would become uneconomical, since inert gases are costly.

The torch shown in FIG. 3 is that which has overcome the aforementioned shortcomings. Similarly as in the case of FIG. 1, a front plate 41, a center plate 42 and and a rear plate 43 are secured together in layers while interposing therebetween insulating rings 44 and 45. Each of the aforesaid three plates are provided respectively with cooling chambers 46, 47 and 48. A rod electrode 49 is affixed to the rear plate 43, while in the front plate 41 is affixed a ring shaped electrode 50. Within the center plate 42 there are formed in succession in a row from back to front a cylindrical inner chamber 51, a conical passage 52, and an intermediate nozzle 53. The intermediate nozzle 53 communicates with an outer chamber 54 of substantially disk shape formed to the front of the intermediate nozzle 53 between the front plate 41 and the center plate 42, and to the front of this outer chamber 54 the aforesaid ring-shaped electrode 50 is disposed. When the front plate 41 and the rear plate 43 are connected to the opposite terminals of an electric source 55 so as energize negatively and positively the rod electrode 49 and the ring-shaped electrode 50, respectively, and an inert fluid, such as argon gas, is supplied from a supply pipe 56, a high temperature plasma arc 57 is produced between the electrodes 49 and 50. The plasma arc 57 that has been enveloped with this inert fluid is further enveloped with a non-inert fluid such as air or water, etc. supplied from a supply pipe 58 into the outer chamber 54, and after passing through the ring-shaped electrode 50 is jetted to the outside. Since a narrow intermediate nozzle 53 has been provided in the above torch, even if the quantity of the inert gas that passes therethrough is small, it is still possible to maintain the pressure within the inner chamber 51 sufficiently high. Therefore, so long as the pressure is held within the range that is less than the aforesaid high pressure, it becomes possible to regulate the pressure of air or water, etc. in the outer chamber 54, whereby the temperature of the plasma arc 57 can be regulated, or uniformity and stabilization can be planned for without causing erosion of the rod electrode 49. Moreover, the consumption of the inert gas is at all times economical. 59 and 60 are the pressure gauges that have been fitted to the inner chamber 51 and the outer chamber 54, respectively.

If a part of the fluid of the outer chamber should flow backwards into the intermediate nozzle 53, this fluid would decompose and ionize into charged ions by the high heat of the plasma arc. Therefore, if the center plate 42 is connected to an electric source 55 through an electric variable resistance 61, and a positive electric pressure is applied to the intermediate nozzle 53, the positive ions among the aforesaid decomposed ions would not be able to pass through the intermediate nozzle 53. Thus, the positive ions would not act on the negative rod electrode 49, and in consequence the erosion thereof can be prevented. By doing thus, even in case the difference in pressure of the two chambers 51 and 54 is small, it is possible to fully prevent the erosion of the rod electrode 49, while at the same time maintain the uniformity and stabilization of the plasma arc 57.

While in the embodiments described hereinabove that in which the plasma arc is enveloped by two layers of fluids has been shown, a third fluid injection passage may be provided so that the plasma arc is enveloped by three layers of fluids. Moreover, while in FIG. 3 is shown that in which the supplied fluid is in the form of whirls 62 and 63, these whirls are not necessarily required.

While we have shown and described some preferred embodiments of our invention, it will be understood that it is not to be limited to all of the details shown, but is capable of modification and variation within the spirit of the invention and within the scope of the claims.

What is claimed is:

1. A plasma arc torch comprising a negative rod electrode, a positive ring-shaped electrode forward thereof, a conical passage for jetting in an annular fashion an inert fluid in the direction of said ring-shaped electrode, said inert fluid being jetted in a manner such as to envelop the periphery of said rod electrode as well as the periphery of a plasma arc emitted from said electrode, an intermediate nozzle of a small cross-sectional area in a row with and forward of said passage, and an outer chamber disposed between said intermediate nozzle and said ring-shaped electrode, characterized in that a non-inert fluid selected from the group consisting of air and water is jetted outwardly in an annular fashion between said plasma arc enveloped by said inert fluid and the internal periphery of said ring-shaped electrode while maintaining the pressure within said outer chamber at a lower pressure than that of said conical passage.

2. A plasma arc torch as set forth in claim 1, wherein the intermediate nozzle has been positively energized.

References Cited in the file of this patent

UNITED STATES PATENTS

| | | |
|---|---|---|
| 2,858,411 | Gage | Oct. 28, 1958 |
| 2,906,858 | Morton | Sept. 29, 1959 |
| 2,923,811 | Feldmeyer et al. | Feb. 2, 1960 |
| 2,960,594 | Thorpe | Nov. 15, 1960 |